United States Patent [19]
Ojala et al.

[11] Patent Number: 5,914,656
[45] Date of Patent: Jun. 22, 1999

[54] ENVIRONMENTAL CONDITION DETECTOR TRANSMITTER INTERFACE

[75] Inventors: Roy Ojala, Waterloo; Rick G. Whittaker, New Hamburg, both of Canada

[73] Assignee: NEXSYS Comtech International, Inc., Waterloo, Canada

[21] Appl. No.: 09/031,096

[22] Filed: Feb. 26, 1998

Related U.S. Application Data

[60] Provisional application No. 60/043,125, Apr. 10, 1997.

[51] Int. Cl.$^6$ .......................... G08B 19/00; G08C 19/16
[52] U.S. Cl. ................... 340/521; 340/539; 340/870.01; 340/870.03
[58] Field of Search .................................. 340/504, 505, 340/521, 531, 539, 628, 870.01, 870.02, 870.03

[56] References Cited

U.S. PATENT DOCUMENTS

| | | | |
|---|---|---|---|
| 4,135,181 | 1/1979 | Bogacki et al. | 340/310.01 |
| 4,168,494 | 9/1979 | Hummel et al. | 340/521 |
| 4,361,832 | 11/1982 | Cole | 340/505 |
| 4,399,510 | 8/1983 | Hicks | 705/412 |
| 4,618,853 | 10/1986 | Yuchi | 340/505 |
| 4,646,084 | 2/1987 | Burrowes et al. | 340/870.03 |
| 4,654,662 | 3/1987 | Van Orsdel | 340/870.03 |
| 4,660,035 | 4/1987 | Hoffman | 340/870.02 |
| 4,737,770 | 4/1988 | Brunius et al. | 340/539 |
| 4,804,957 | 2/1989 | Selph et al. | 340/870.03 |
| 4,881,070 | 11/1989 | Burrowes et al. | 340/870.02 |
| 4,940,976 | 7/1990 | Gastouniotis et al. | 340/870.02 |
| 5,117,219 | 5/1992 | Tice et al. | 340/518 |
| 5,159,315 | 10/1992 | Schultz et al. | 340/539 |
| 5,166,664 | 11/1992 | Fish | 340/539 |
| 5,179,496 | 1/1993 | Mimura | 361/154 |
| 5,428,343 | 6/1995 | Kikuchi et al. | 340/518 |
| 5,432,507 | 7/1995 | Mussino et al. | 340/870.03 |
| 5,491,473 | 2/1996 | Gilbert | 340/870.01 |
| 5,495,239 | 2/1996 | Ouellette | 340/870.02 |
| 5,553,094 | 9/1996 | Johnson et al. | 375/200 |
| 5,563,579 | 10/1996 | Carter | 340/539 |
| 5,568,121 | 10/1996 | Lamensdorf | 340/539 |
| 5,590,179 | 12/1996 | Shincovich et al. | 379/106.06 |

*Primary Examiner*—Jeffery A. Hofsass
*Assistant Examiner*—Van T. Trieu
*Attorney, Agent, or Firm*—Wells, St. John, Roberts, Gregory & Matkin P.S.

[57] ABSTRACT

A transmitter interface board for integration with a conventional environmental condition detector (such as a smoke detector, carbon monoxide detector etc.), for transmitting information on the operating status of the detector to a remotely located monitoring facility. The transmitter interface is connected to a detector circuit in the condition detector in a manner such that the interface can detect alarm pulses emitted from the detector. Based on the number of alarm pulses emitted in a pre-defined interval the transmitter interface is able to determine the operating status of the detector. The operating status information is then be sent by a transmitter to the central monitoring facility.

1 Claim, 3 Drawing Sheets

5,914,656

ENVIRONMENTAL CONDITION DETECTOR TRANSMITTER INTERFACE

CROSS REFERENCE TO RELATED APPLICATIONS

This application claims priority from U.S. Provisional application 60/043,125, filed Apr. 10, 1997, titled "Remote Home Monitoring System."

FIELD OF THE INVENTION

This invention relates to the field of remote monitoring of environmental condition detectors and more specifically to the field of environmental condition detectors (such as smoke and carbon monoxide detectors) having transmission capabilities for transmitting operating status information to a remotely located monitoring facility.

BACKGROUND OF THE INVENTION

Environmental condition detectors, such as smoke detectors, having the ability to transmit operating status information to a remote central monitoring facility have been proposed. Signals generated by the smoke detectors are sent to a central facility using either hardwire or radio frequency communications methods. However, all of these systems require the complete replacement of existing smoke detectors with those designed for use in a remote monitoring system. Unfortunately, the replacement of smoke detectors can be an expensive renovation, reducing the consumer acceptability of these systems. One smoke detector system having the aforementioned characteristics is disclosed in U.S. Pat. No. 4,618,853 issued on Oct. 21, 1986.

In addition, many of the most recently proposed smoke detectors capable of transmitting operating status information do so to surrounding smoke detectors. In such systems, as proposed in U.S. Pat. No. 5,159,315 issued on Oct. 27, 1992, the receipt of the status information by surrounding smoke or other environmental condition detectors causes these detectors to sound alarms. While such systems are useful in industrial settings where the area to be monitored is large, these smoke detectors add little value to the monitoring of smaller personal dwellings where environmental conditions will be detected by all detectors within a very limited time interval.

SUMMARY OF THE INVENTION

It is an object of the present invention to provide a transmitter interface board for attachment to a compatible conventional environmental condition detector, the interface board being capable of transmitting detector operating status information to a remotely located monitoring facility.

In accordance with an aspect of the present invention, there is provided an environmental condition detector transmitter interface for electrical connection to an environmental condition detector having a detector circuit capable of transmitting an alarm pulse signal and a battery having battery terminals, the transmitter interface being adapted to communicate with a remotely located monitoring facility comprising: a voltage detector for detecting fluctuations in the voltage of the battery and for generating a voltage condition signal representing a low battery condition; a current detector for detecting fluctuations in the current drawn from the battery and for generating a current condition signal representing the alarm pulse signal from the detector circuit; a processor electrically connected to the voltage detector and the current detector for receiving and interpreting the voltage condition signal and the current condition signal to generate a status message; and a transmitter electrically connected to the processor for transmitting the status message to the monitoring facility.

In accordance with another aspect of the present invention, there is provided a method of detecting an operating condition of a environmental condition detector having a detector circuit and a battery and transmitting the operating condition information to a remote monitoring facility, said method comprising the steps of: (a) sensing current fluctuations being drawn from the battery by the detector circuit, the current fluctuations being representative of an alarm in response to a sensed environmental condition; (b) sending a predetermined number of alarm pulses indicative of the current fluctuations to a processor; (c) sensing voltage fluctuations in the battery, the voltage fluctuations being representative of a low battery condition; (d) sending a low battery message to the processor in response to the voltage fluctuations; (e) counting and storing the alarm pulses in the processor; (f) determining the operating condition of the condition detector in the processor based on the number of alarm pulses received; (g) packaging the low battery message and the operating condition as a sensor data packet; and (h) transmitting the sensor status data packet to the monitoring facility.

BRIEF DESCRIPTION OF THE DIAGRAMS

Embodiments of the invention will be described by way of example with the drawings in which.

DETAILED DESCRIPTION OF AN EMBODIMENT OF THE INVENTION

The present invention will be discussed in conjunction with a smoke detector as a particular implementation of the environmental condition detector. Other detectors, such as carbon monoxide and the like, can also implement the invention provided the detector includes a detector circuit and a power source for measuring current draw and voltage variations.

Smoke Detector—Overview

Figure 1:
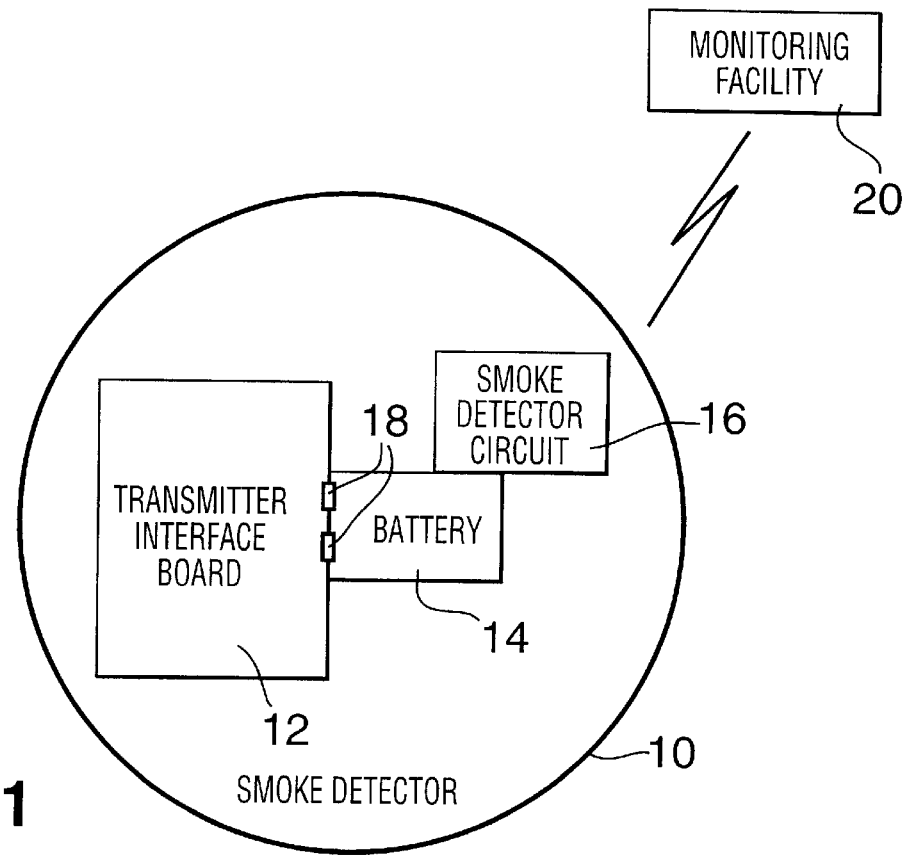
FIG. 1 illustrates a block diagram of a standard smoke detector incorporating a transmitter interface board according to the present invention.

FIG. 1 illustrates a smoke detector 10 containing a smoke detector circuit 16, a battery 14 (typically 9 volts) having two battery terminals 18, and a transmitter interface board 12. The smoke detector 10 transmits operating status information to a remotely located monitoring facility 20 by way of the transmitter interface 12. See Applicant's related application 60/043,125 filed Apr. 10, 1997 titled "Remote Home Monitoring System" for a discussion regarding the central facility, hereby incorporated by reference.

The smoke detector circuit 16 must satisfy certain criteria that can be found in most standard commercially available smoke detectors. Specifically, the smoke detector circuit 16 must emit three separate status signals in response to three different conditions: (1) a low battery signal in response to a low battery condition; (2) a smoke detection alarm signal in response to a detected smoke condition that exceeds a predetermined threshold defined within the smoke detector circuit 16; and (3) a test alarm signal is response to a initiating a test condition. All three status signals must be distinguishable from one another in terms of the number of alarm pulses emitted during a pre-defined interval.

The battery 14, which is part of a traditional stand-alone smoke detector 10, is the power source for the smoke detector circuit 16 and the transmitter interface board 12 as well as serving as an interface point between the two via the battery terminals 18.

The transmitter interface board 12 detects the status signals generated by the smoke detector circuit 16. As discussed above, the different conditions cause the smoke detector circuit 16 to emit different status signals by emitting a different number of pulses in a pre-defined interval. The transmitter interface board 12 detects these pulses and counts them to determine the cause of the alarm (i.e. low battery, smoke detection, test). The reason for the alarm can then be transmitted to the remotely located monitoring facility by the transmitter interface 12.

Interface Board—Layout

Figure 2:
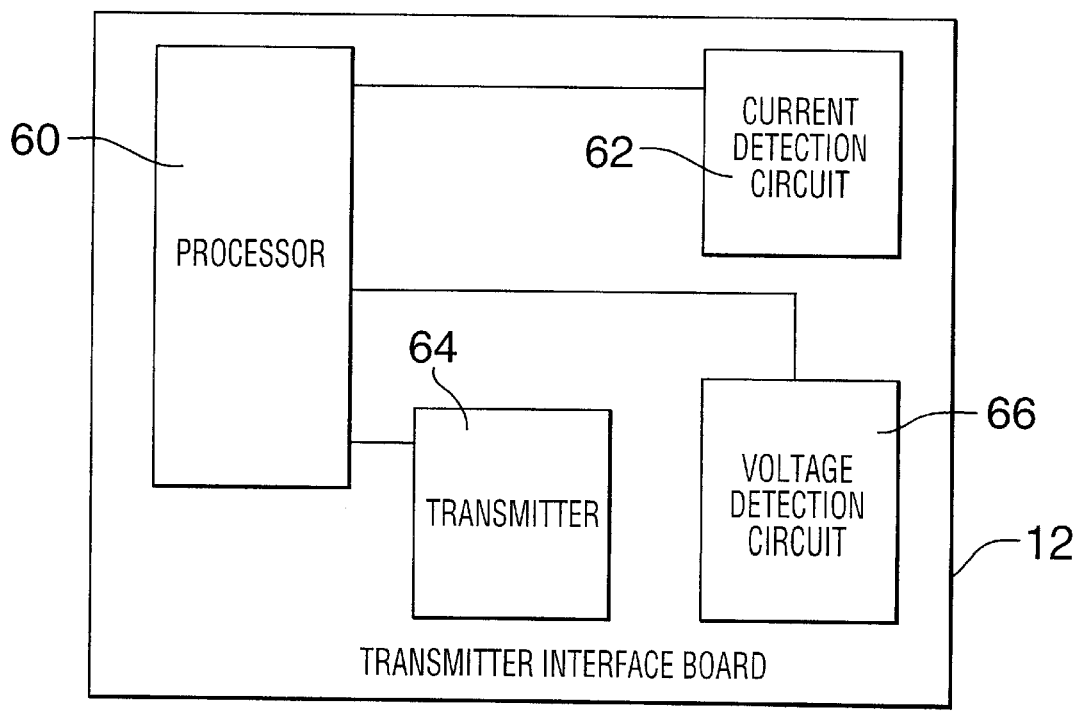
FIG. 2 illustrates a detailed block diagram of the electronic architecture of the transmitter interface board of FIG. 1.

The transmitter interface board 12 includes a processor 60, a transmitter 64, a current detection circuit 62 and a voltage detection circuit 66 as shown in FIG. 2. The current detection circuit 62 detects alarm pulses emitted from the smoke detector circuit 16 by monitoring the current being drawn from the battery terminals 18. The voltage detection circuit 66 detects a low battery condition by monitoring the voltage across the battery terminals 18. The processor 60 determines the operating condition of the smoke detector 10 based on the number of alarm pulses emitted in a pre-defined interval (i.e. the status signals). The transmitter 64 transmits the detected operating condition to the remotely located monitoring facility 20 using wireless transmission networks for example.

The transmitter interface board 12 is a removable circuit board capable of fitting into and integrating with the standard smoke detector 10. As such the transmitter interface board 12 is relatively small in size and has low power consumption requirements since it shares power from the battery 14 with the smoke detector circuit 16.

Interface Board—Voltage Detection Circuit

The voltage detection circuit 66 of the transmitter interface board 12 is used to detect a low battery condition by monitoring the voltage across the battery terminals 18. When the voltage drops below a certain threshold the voltage detection circuit 66 determines this as a low battery condition and the processor 60 is notified accordingly. Preferably, the low battery threshold is set at a level slightly higher than the smoke detector circuit 16 low battery signal so that the voltage detection circuit 66 notices a low battery condition before the smoke detector circuit 16 notices the same condition and emits a low battery alarm pulse. For example, in a preferred embodiment of the invention, the voltage detection circuit 66 is designed with a low battery threshold voltage of 7.94 volts, and the smoke detector circuit 16 is designed with a low battery threshold voltage of 7.8 volts. The voltage detection circuit 66 includes a low power voltage regulator 100 having terminals 102–116. The voltage detection circuit 66 regulates a battery voltage 118 (9 volts) having a associated capacitor 119. The battery 14 is connected to the circuit 66 through a connection module 120 having a grounded terminal $T_g$ and a supply terminal $T_S$ passing through a diode 122 to protect against reverse polarity. The circuit 66 regulates the battery voltage 118 in such a way that a feed voltage 124 (constant 3.3 volts) is always supplied to the processor 60 and the transmitter 64. The feed voltage 124 is connected to a capacitor 125. In addition, the voltage regulator 100 also provides a regulator voltage 126 from the terminal 112 that changes only when the battery voltage 118 drops below a specified threshold. A resistor 128 connected between the combined terminals 114 and 116, and 112 is a pull up resistor on the open drain output of terminal 112 on the regulator 110. Resistors 130 and 132 form a voltage divider between the battery voltage (9 volts) 118 and the terminal 106 (1.3 volts) on the regulator 100. This arrangement produces a low battery threshold of 7.94 volts. The threshold value may change from one manufacture to another in which case the appropriate changes to the interface board can be made as discussed below. When the battery voltage 118 falls below this level the regulator voltage 126 changes, notifying the processor 60 of a low battery condition. Terminals 108 and 110 are grounded, and terminals 102 and 104 are input voltage terminals.

Interface Board—Current Detection Circuit

The current detection circuit 62 detects when alarm pulses are emitted from the smoke detector circuit 16 by monitoring the current being drawn from the battery terminals 18. When the smoke detector circuit 16 emits an status signal the current drawn from the battery 14 increases during each of the audible alarm pulses. The increase in the current drawn from the battery 14 produces a change in the output of the current detection circuit 62 to the processor 60 where the change is interpreted as a pulse.

The current detection circuit 62 includes an operational amplifier (op-amp) 168 having terminals 170–178. Preferably, the non-inverting gain of the op-amp 168 is set at over 1000 by resistors 180 and 182. Pulses from a battery voltage (9 volts) 184 are coupled to the inverting input terminal 172 of the op-amp 168 through a capacitor 186 and resistor 187. A resistor 187 filters the pulses from the battery voltage 184.

A signal at output 190, from terminal 176 of the op-amp 168 through a resistor 192, is passed to the processor 60 where it is interpreted as a pulse. The resistor 192 limits the current from the op-amp's 168 output 176 to the processor's 60 3.3 volt supply when the op-amp's 168 output is at 9 volts. Negative pulses from the battery voltage 184 are amplified by the op-amp 168 through terminal 178 and cause the output of the op-amp 168 to go to ground through terminal 174.

Interface Board—Processor

The voltage detection circuit 66 and the current detection circuit 62 pass the signals they detect to the processor 60 where this information is used to determine the operating status of the smoke detector circuit 16 (i.e. low battery; smoke detection; or test)

When the output of the battery 14 falls below a specified value, the output of the voltage detection circuit 66 similarly is pulled to a low voltage and the processor 60 receives a low battery signal. The processor 60 sets a low battery flag when a low battery signal is received from the voltage detection circuit 66.

When the current drawn from the battery 14 is increased during an alarm pulse the current detection circuit 62 sends a pulse notification to the processor 60. This signal wakes the processor 60 from a sleeping state and forces the processor 60 to start counting the number of pulse notifications received. The number of pulses received per interval allow the processor 60 to determine if the condition is a smoke alarm or a test.

In an effort to preserve power consumption a watchdog timer (WDT) function is provided in the processor 60. The processor 60 is in a sleeping state when no pulses are detected. The WDT wakes the processor 60 to periodically increment a daily clock counter and also to check for a low battery condition. The WDT function also forces the processor 60 to reset if the watchdog timer times out. Since the 24 hour clock is determined by the watchdog timer any variations in WDT period will result in proportional variations in the 24 hour clock.

A change in the input to the processor 60 or a WDT time-out will cause the processor 60 to wake-up from a sleeping state. Once the battery condition has been determined by either a pulse check or a voltage battery check, the daily clock counter is incremented and then checked to see if it has hit the 24 hour mark. If the counter has hit this mark the appropriate message is sent based on the status of the battery, either system OK or low battery and the pulse counter is reset. The processor 60 then returns to the sleeping state.

Figure 3:
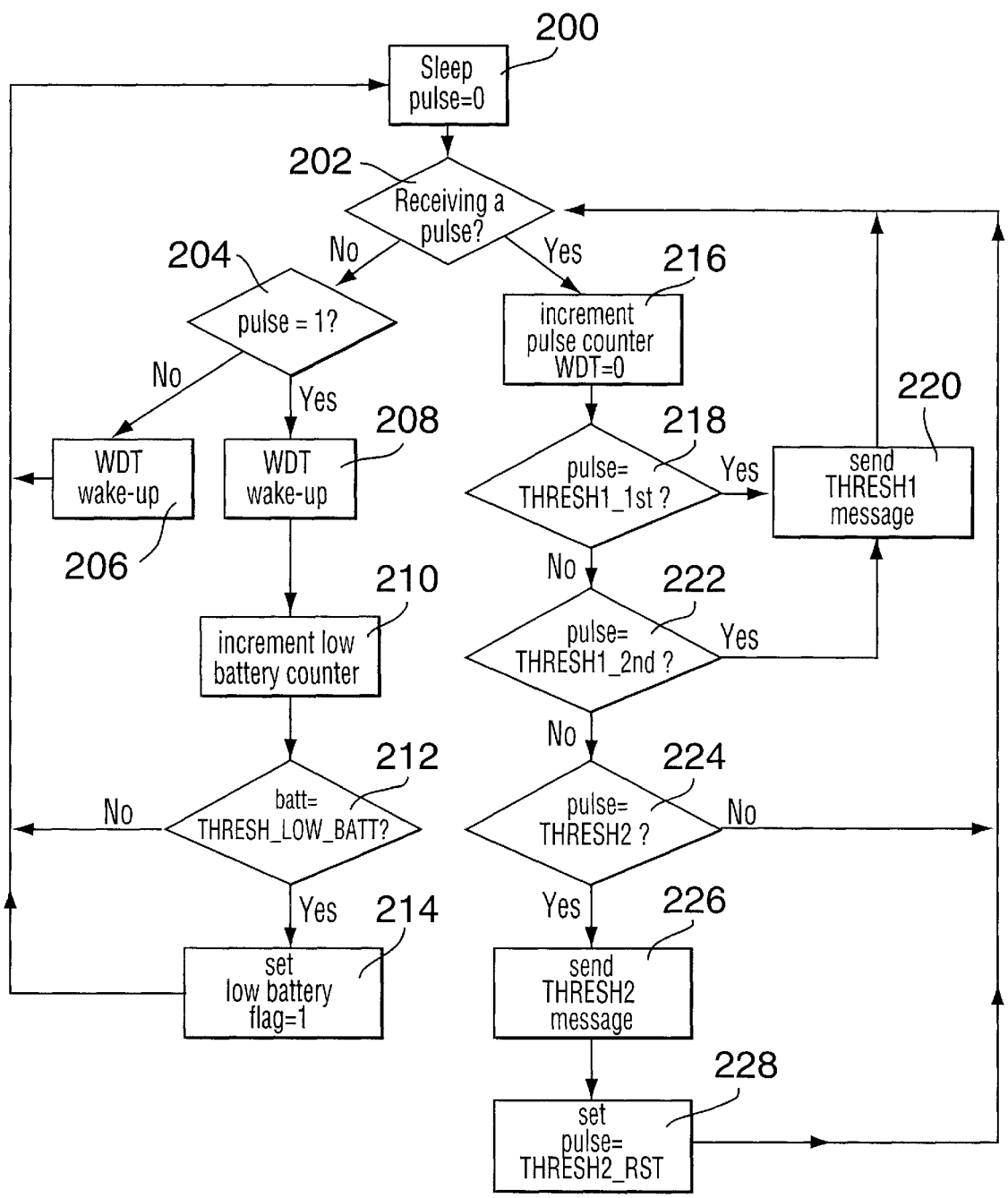
FIG. 3 illustrates a flow chart of the pulse counting mechanism of the transmitter interface board of FIG. 2.
Figure 4:
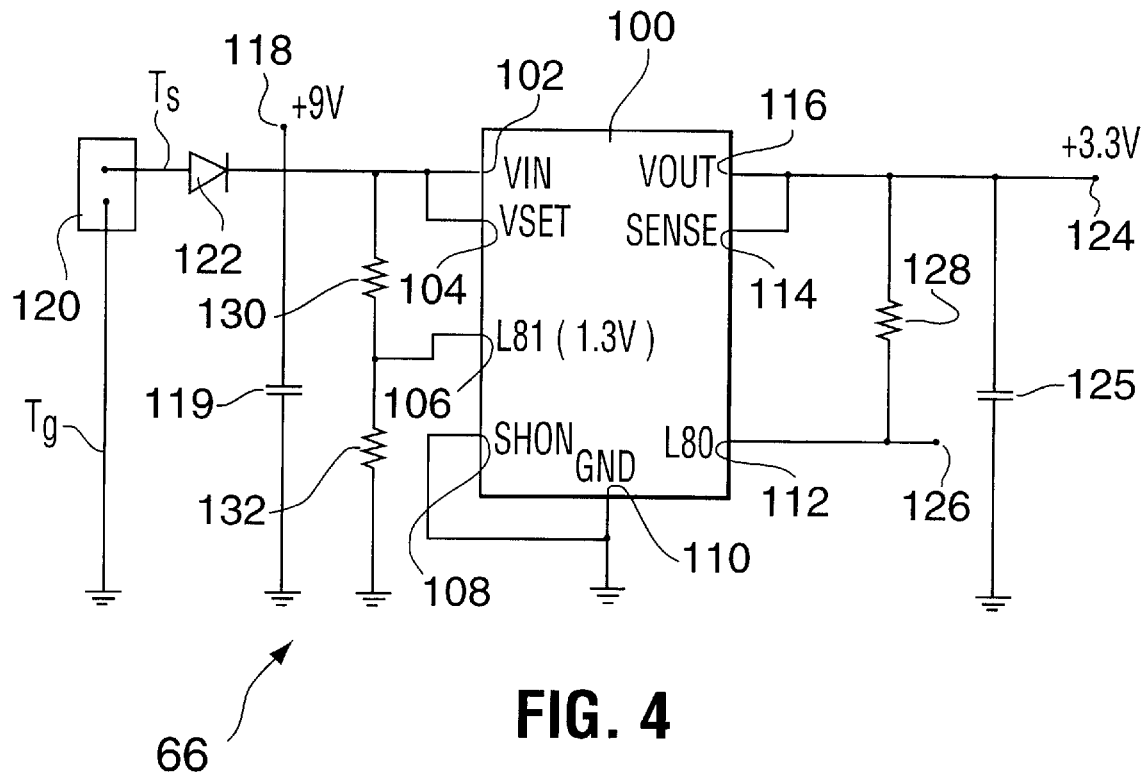
FIG. 4 illustrates a circuit diagram of the voltage detection circuit of the interface board.
Figure 5:
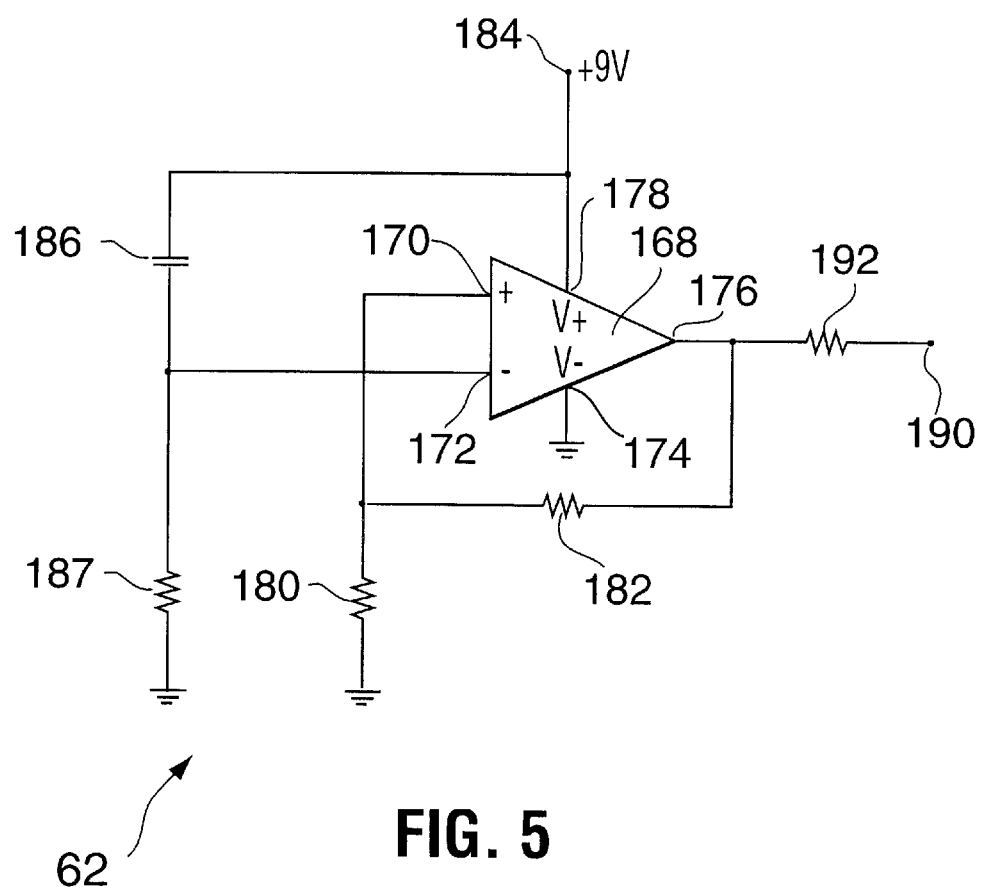
FIG. 5 illustrates a circuit diagram of the current detection circuit of the interface board.

FIG. 3 provides a flow chart detailing the steps of this pulse detection mechanism.

The processor 60 is woken from a sleeping state 200 by the receipt of a pulse 202.

If no pulse is currently being received a pulse counter (pulse) is checked at step 204 to see if it has a value of one, signifying the receipt of a low battery pulse. If pulse=1 processing continues to the WDT function at step 208 and a low battery pulse counter (batt) is incremented at step 210 and its value is compared to a low battery threshold constant (THRESH_LOW_BATT) at step 212. The value of THRESH_LOW_BAT corresponds to the number of low battery pulses that must occur in one day before a low battery message is sent. In the case where the low battery pulse counter (batt) is equal to the low battery threshold constant (THRESH_LOW_BATT) a low battery flag is set at step 214 to ensure eventual transmission of a low battery message to the monitoring facility 20. In the case where the low battery pulse counter (batt) is not equal to the low battery threshold constant (THRESH_LOW_BATT) processing loops back to step 200 for further monitoring. If pulse≠1 at step 204 the WDT function is notified at step 206 and processing loops back to step 200 for further monitoring.

If a pulse has been received as determined by step 202 a pulse counter (PC) is incremented and the WDT function is reset at step 216. The PC value is then compared to three constant threshold values THRESH1_1st at step 218, THRESH1_2nd at step 222 and THRESH2 at step 224 (all defined below) and a message (either THRESH1 or THRESH2) corresponding to the determined threshold value is sent at steps 220 and 226. If pulse=THRESH2 at step 223 processing continues through step 226 to step 228 where the pulse is set to be equal to THRESH2_RST. Specific examples, of this process are provided hereinbelow.

Table A1 shows the timing of the signal from the current detector circuit 62 during a low battery condition.

TABLE A1

| Signal Type | Minimum | Typical | Maximum |
| --- | --- | --- | --- |
| low (msec) | 8 | 10 | 12 |
| high (msec) | 32 | 40 | 48 |

Table A2 shows the timing of the signal from the current detector circuit 62 during a detected smoke condition.

TABLE A2

| Signal Type | Minimum | Typical | Maximum |
| --- | --- | --- | --- |
| low (msec) | 120 | 160 | 208 |
| high (msec) | 60 | 80 | 104 |

Interface—Threshold Values

To keep a record of an alarm situation the processor 60 has pre-determined threshold values. These threshold values will describe the current condition based on the length of time that the alarm has been sounding. Threshold values for the alarm pulses from the smoke detector circuit 16 are determined based on the interval between continuous pulses. The threshold values have been set according to the following formula:

$$v = dtv/ni$$

where v=value is the numerical value of the threshold, dtv=desired time value (sec) is the entire time during which the threshold value is valid, and the ni=nominal interval (sec) is the interval between continuous pulses. The nominal interval is generally 240 ms although it may vary between 180 ms and 312 ms. The value of the threshold constants represents the number of alarm pulses that must be emitted before a message corresponding to the threshold is sent.

Table B1 shows the threshold variables and their equivalent numerical values and time values.

TABLE B1

| Threshold Variable | Value | Time Value |
| --- | --- | --- |
| Thresh1_1st | 63 | 15 |
| Thresh1_2nd | 125 | 30 |
| Thresh2 | 250 | 60 |
| Thresh2_Rst | 188 | every 15 sec |

Interface Board—Transmitter

The transmitter 64 of the interface board 12 sends smoke detector status messages to the monitoring facility 20. The status messages (full list in Table C1 below) can be an alert of a smoke detection alarm, a low-battery condition or a daily transmission of a system OK message. The transmitter 64 is a 916.5 MHz hybrid transmitter which is turned on and off by the processor 60 for an On-Off-Keying (OOK) modulation scheme. The antenna for the transmitter 64 is a route on the solder side of the transmitter interface board 12.

There are 6 messages sent from the interface board 12 to the monitoring facility 20 as summarized in Table C1.

TABLE C1

| Message | Description |
| --- | --- |
| PWR_ON | message sent when the power to the smoke detector is turned on |
| SYS_OK | status message transmitted once every 24 hours if a low battery condition has not been detected |
| BAT_LOW | transmitted once every 24 hours if the BAT_LOW_FLAG is set which is set if the low battery condition has been detected in the last 24 hours |
| THRESH1 | transmitted when the smoke alarm pulse count first exceeds THRESH1_1ST and again when the pulse count exceeds THRESH1_2ND |
| THRESH2 | transmitted when the smoke alarm pulse count exceeds THRESH2 and at a regular rate after that until 0 pulses are detected |

TABLE C1-continued

| Message | Description |
| --- | --- |
| THRESH_CLR | transmitted 1 WDT interval after the last smoke alarm pulse is detected |

The processor 60 determines the message to be sent and then packages the message which is then passed off to the transmitter 64 for transmission to the monitoring facility 20 for further processing. Each data packet is 8 bytes and consists of the following items:

i) block length: a one byte character used to indicate the length of the packet length in bytes;
  ii) service function: a 1 byte character indicating which type of device (i.e. smoke detector, CO detector) the data packet originated from in the case where more than one type of environmental condition detector is present in a particular dwelling;
  iii) serial number: a 3 byte field containing an identifying number which is unique for every smoke detector device;
  iv) data: a 1 byte character containing the message indicating the status of the smoke detector (see possible message from Table C1);
  v) CRC: a 2 byte field containing a Cyclic Redundancy Check. The standard CRC-16 polynomial is used to calculate the CRC.

The CRC check on the packet provides a collision detection mechanism. For example, if two smoke detectors are transmitting at the same time the signal interference at the intended receiver will cause the packet to fail its CRC check.

The use of either lithium or alkaline batteries for the 9 volt battery in the smoke detector 10 of the present invention is acceptable. It is preferred that the battery used is of the alkaline zinc type, because of the slower decay curve of the battery voltage in an alkaline allows for better monitoring of the low battery condition.

While this invention has been described with respect to specific embodiments it will be clear to anyone skilled in the art that certain modifications can be made without detracting from the essence of the invention.

We claim:

1. A method of detecting an operating condition of an environmental condition detector having a detector circuit and a battery and transmitting the operating condition information to a remote monitoring facility, said method comprising the steps of:
  (a) sensing current fluctuations being drawn from the battery by the detector circuit, the current fluctuations being representative of an alarm in response to a sensed environmental condition;
  (b) sending a predetermined number of alarm pulses indicative of the current fluctuations to a processor;
  (c) sensing voltage fluctuations in the battery, the voltage fluctuations being representative of a low battery condition;
  (d) sending a low battery message to the processor in response to the voltage fluctuations;
  (e) counting and storing the alarm pulses in the processor;
  (f) determining the operating condition of the condition detector in the processor based on the number of alarm pulses received;
  (g) packaging the low battery message and the operating condition as a sensor data packet; and
  (h) transmitting the sensor status data packet to the monitoring facility, wherein the sensor data packets includes a message selected from the group consisting of: power on, system OK, battery low, first threshold; second threshold, and threshold clear, where the power on message indicates that the detector is turned on; the system OK message indicates a low battery condition has not been detected within a predetermined time interval; the battery low message indicates that the low battery condition has been detected within the predetermined time interval; the first threshold message indicates that the alarm pulse count exceeds a first predetermined threshold; the second threshold message indicates that the alarm pulse count exceeds a second predetermined threshold; and threshold clear indicates that the alarm pulse count is below the first predetermined threshold.

* * * * *